United States Patent [19]
Aketa et al.

[11] Patent Number: 6,032,641
[45] Date of Patent: Mar. 7, 2000

[54] FUEL INJECTION DEVICE FOR DIESEL ENGINE

[75] Inventors: Masahiro Aketa; Hideya Miyazaki; Yuzo Umeda; Yuji Takemura, all of Sakai, Japan

[73] Assignee: Kubota Corporation, Japan

[21] Appl. No.: 09/149,078

[22] Filed: Sep. 8, 1998

[30] Foreign Application Priority Data

| May 22, 1998 | [JP] | Japan | 10-141691 |
| Aug. 11, 1998 | [JP] | Japan | 10-226402 |

[51] Int. Cl.$^7$ .................................................. F02M 45/00
[52] U.S. Cl. ................................. 123/299; 123/500
[58] Field of Search .......................... 123/299, 300, 123/478, 480, 500, 501, 502

[56] References Cited

U.S. PATENT DOCUMENTS

| 5,103,785 | 4/1992 | Henkel | 123/299 |
| 5,119,780 | 6/1992 | Ariga | 123/300 |
| 5,165,373 | 11/1992 | Cheng | 123/300 |
| 5,592,915 | 1/1997 | Ishiwata et al. | 123/300 |
| 5,735,248 | 4/1998 | Matsuura et al. | 123/527 |
| 5,911,207 | 6/1999 | Ohishi et al. | 123/299 |

FOREIGN PATENT DOCUMENTS 10-18940  1/1998  Japan.

*Primary Examiner*—Willis R. Wolfe
*Assistant Examiner*—Hieu T. Vo
*Attorney, Agent, or Firm*—Bacon & Thomas PLLC

[57] ABSTRACT

A fuel injection device for a diesel engine adapted to perform a preliminary injection (1) and a main injection (2) to a combustion chamber (3), wherein the preliminary injection (1) is adjusted to begin within a valve overlap term (40).

Within the valve overlap term (40), no intake air is introduced into the combustion chamber (3) or a little if any and the combustion chamber (3) contains a gas of high temperature. If the preliminary injection (1) is conducted into this gas of high temperature within the combustion chamber (3), a preliminary injection fuel vaporizes soon to thereby shorten the ignition lag of a main injection fuel with the result of improving the combustion.

45 Claims, 8 Drawing Sheets

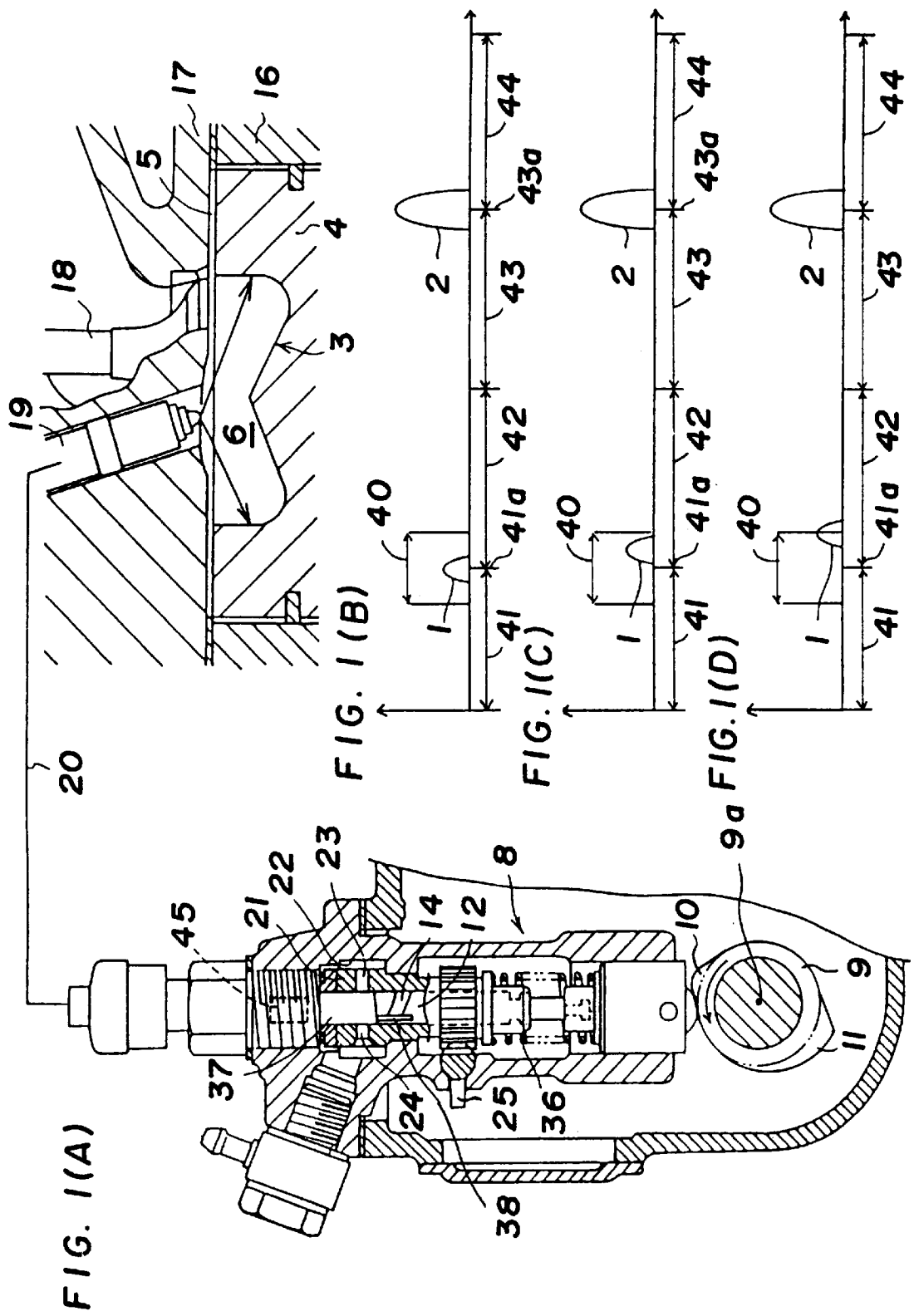

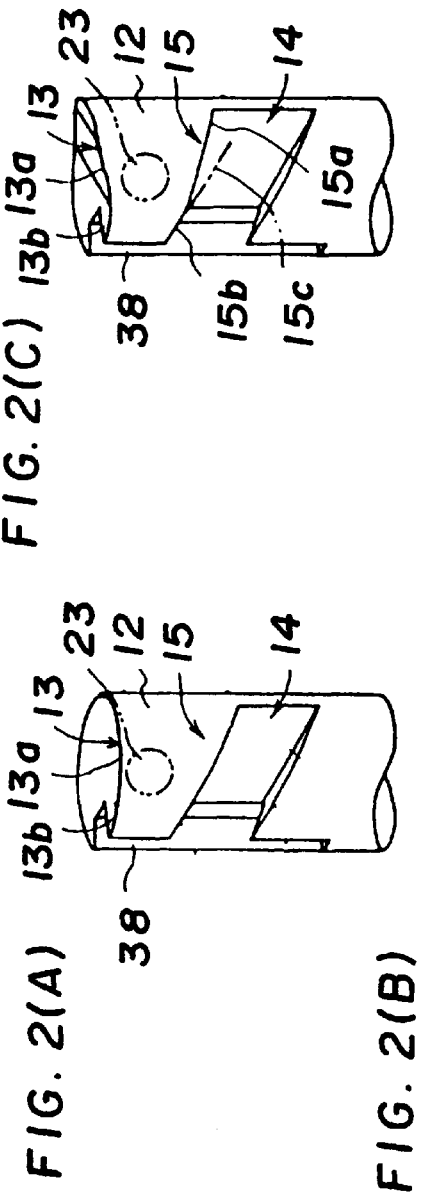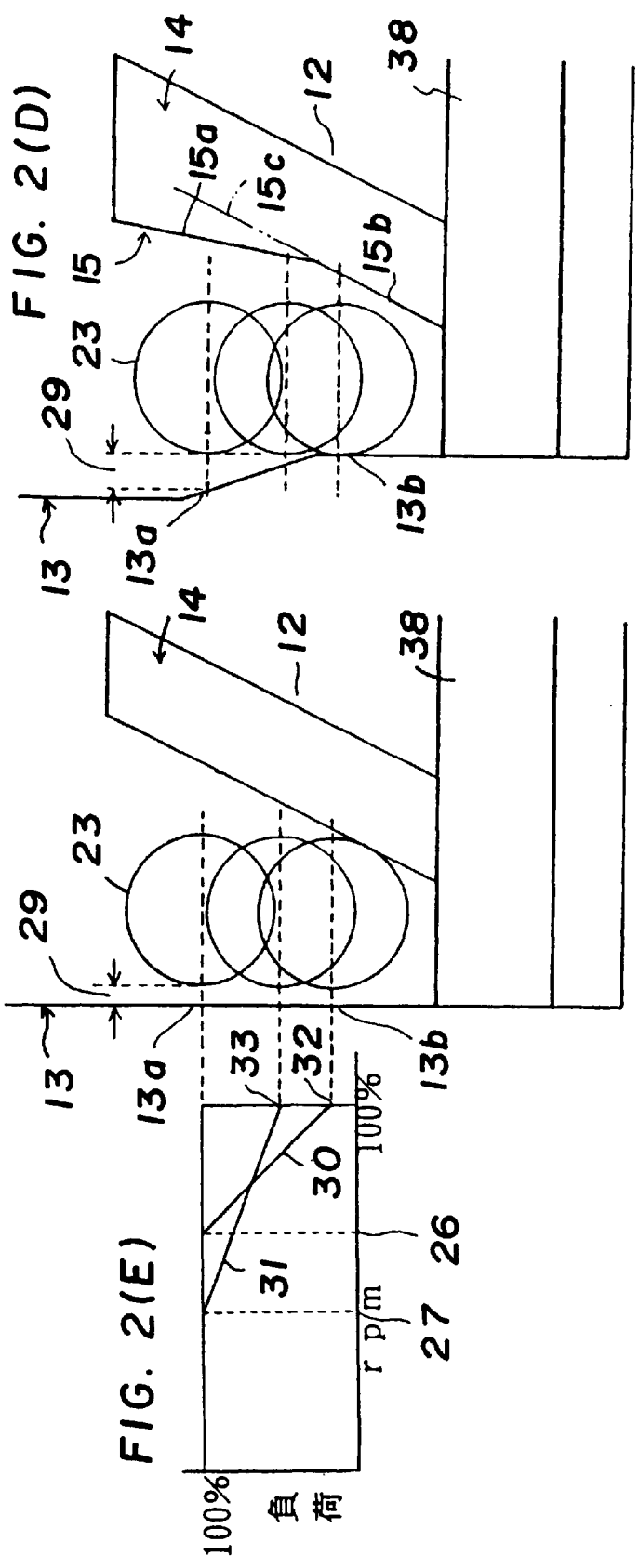

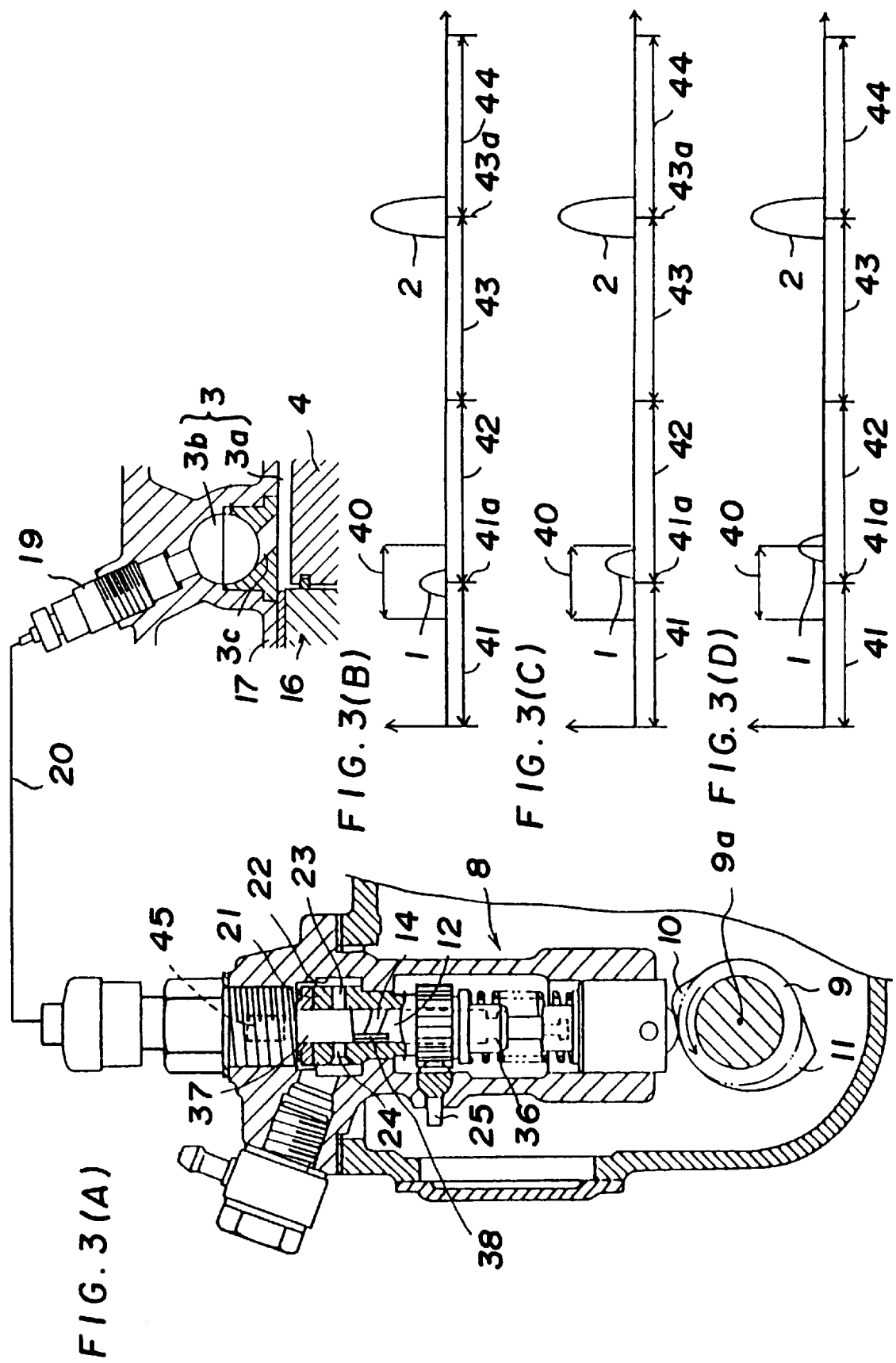

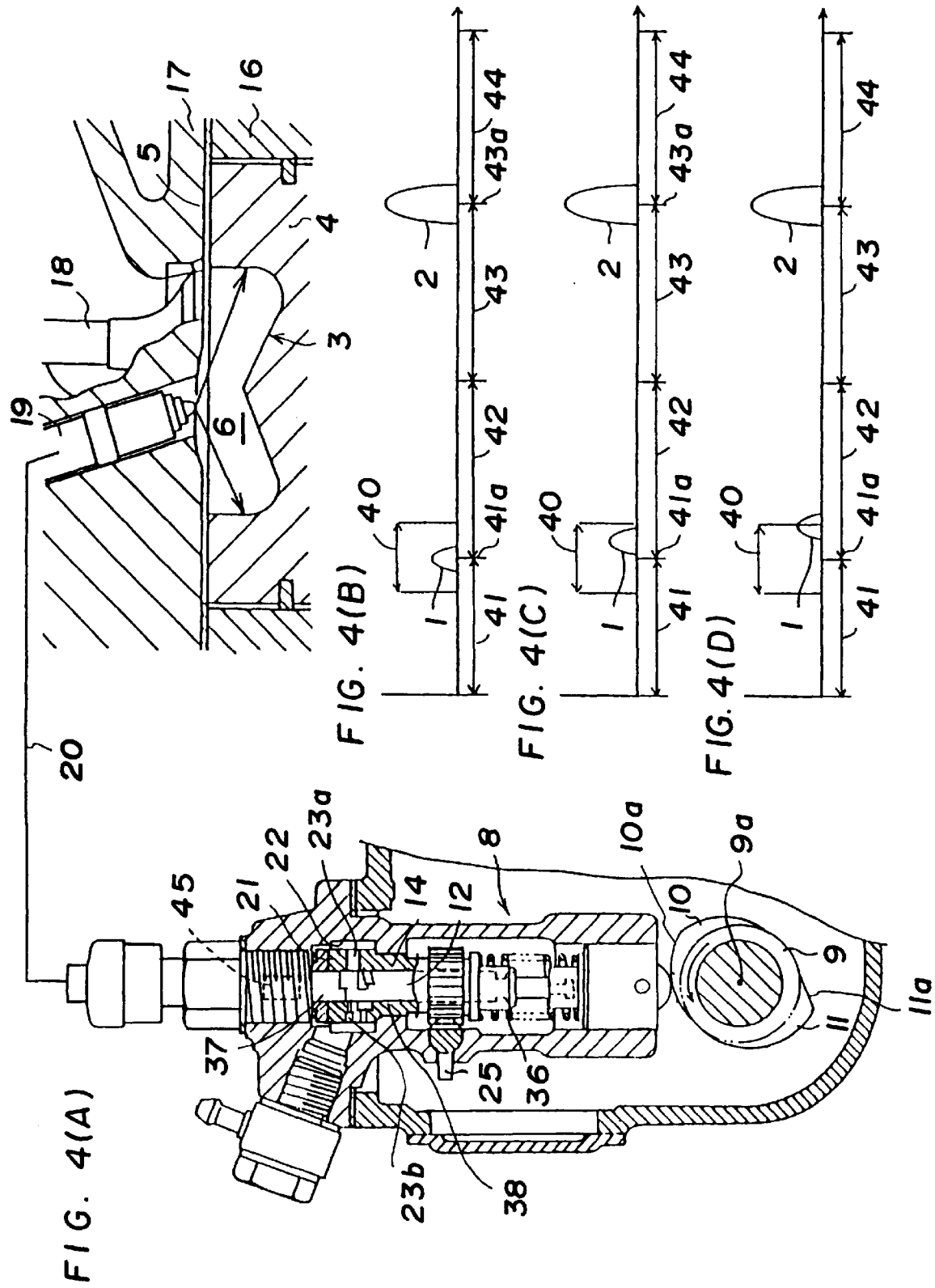

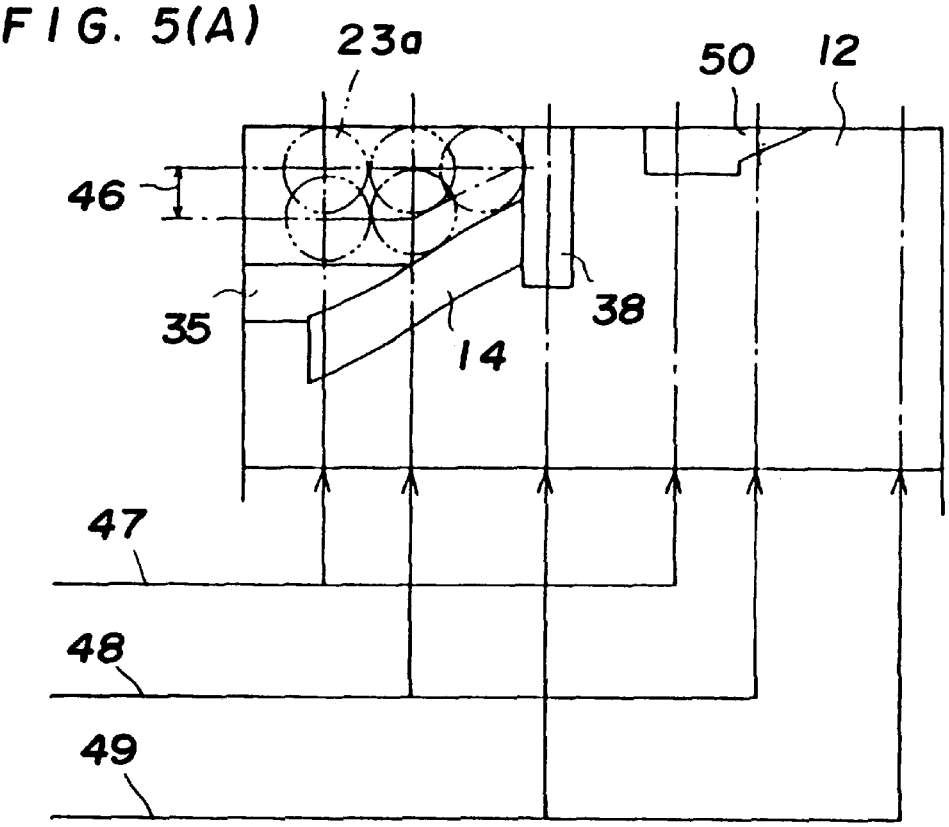
FIG. 5(A)
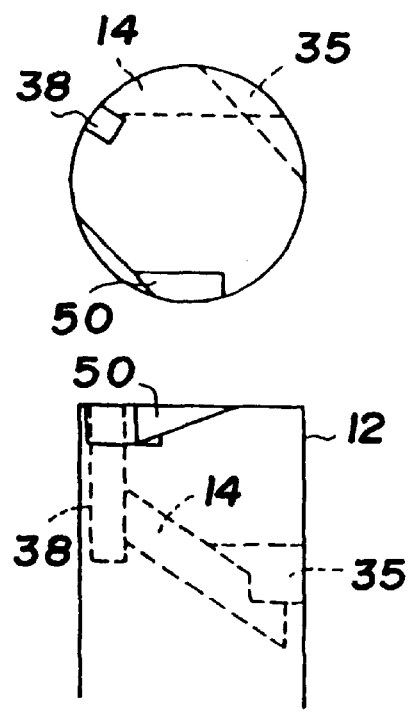
FIG. 5(B)
FIG. 5(C)
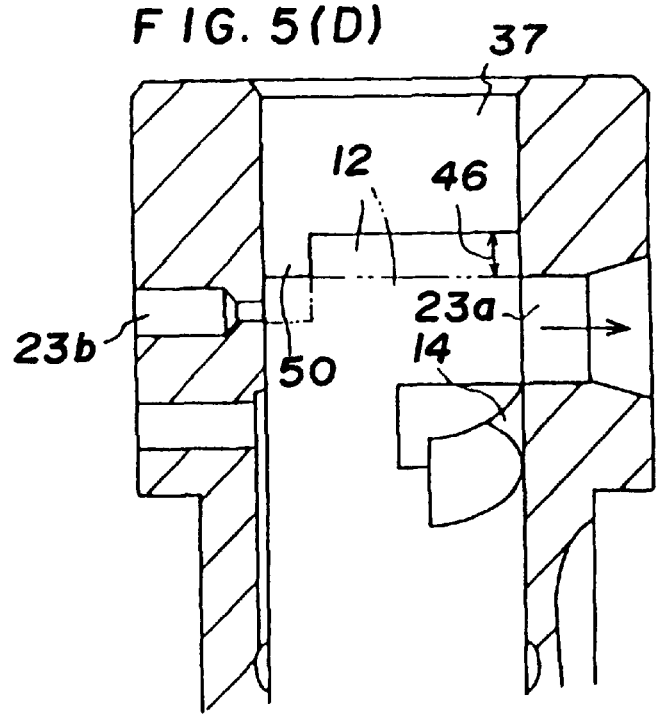
FIG. 5(D)

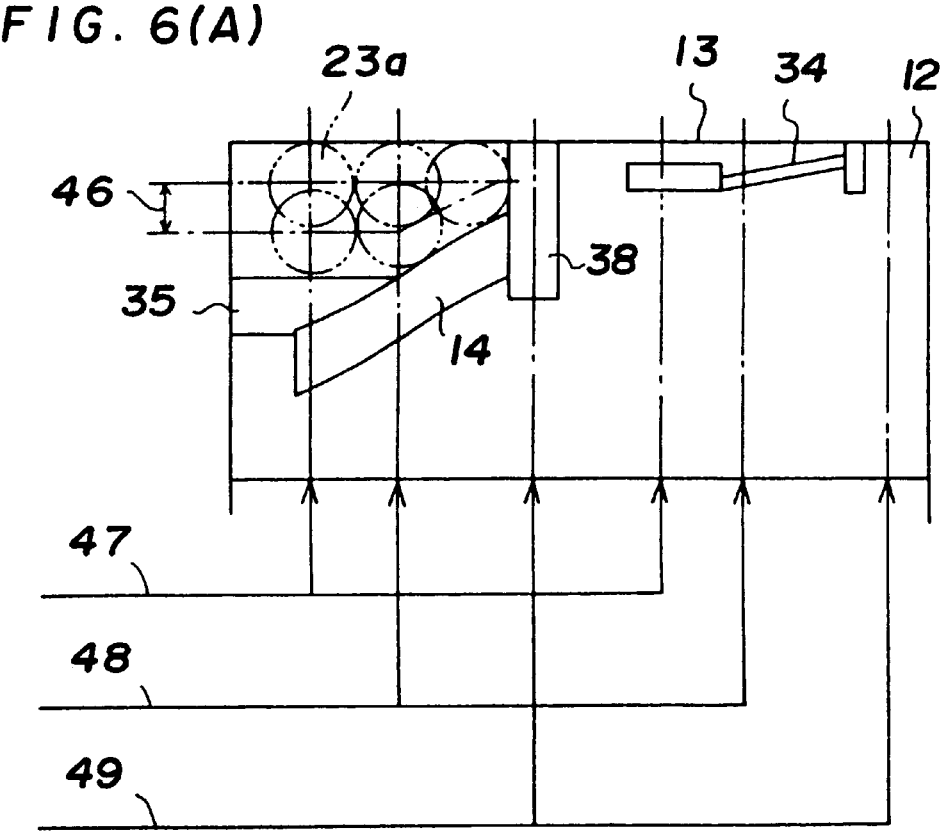
FIG. 6(A)
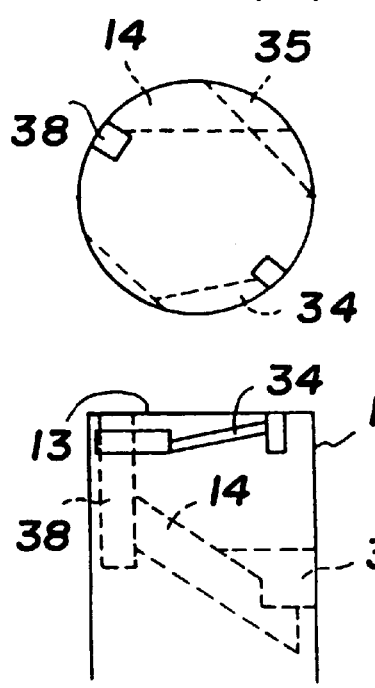
FIG. 6(B)
FIG. 6(C)
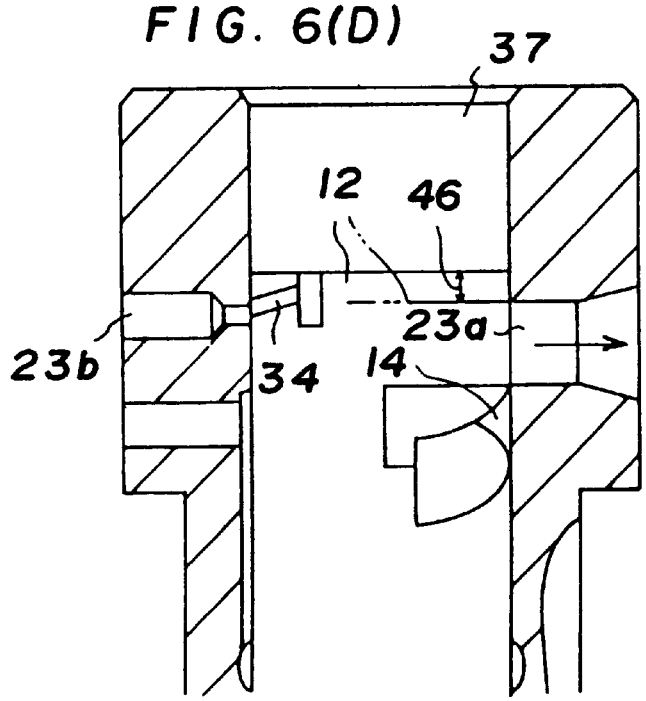
FIG. 6(D)

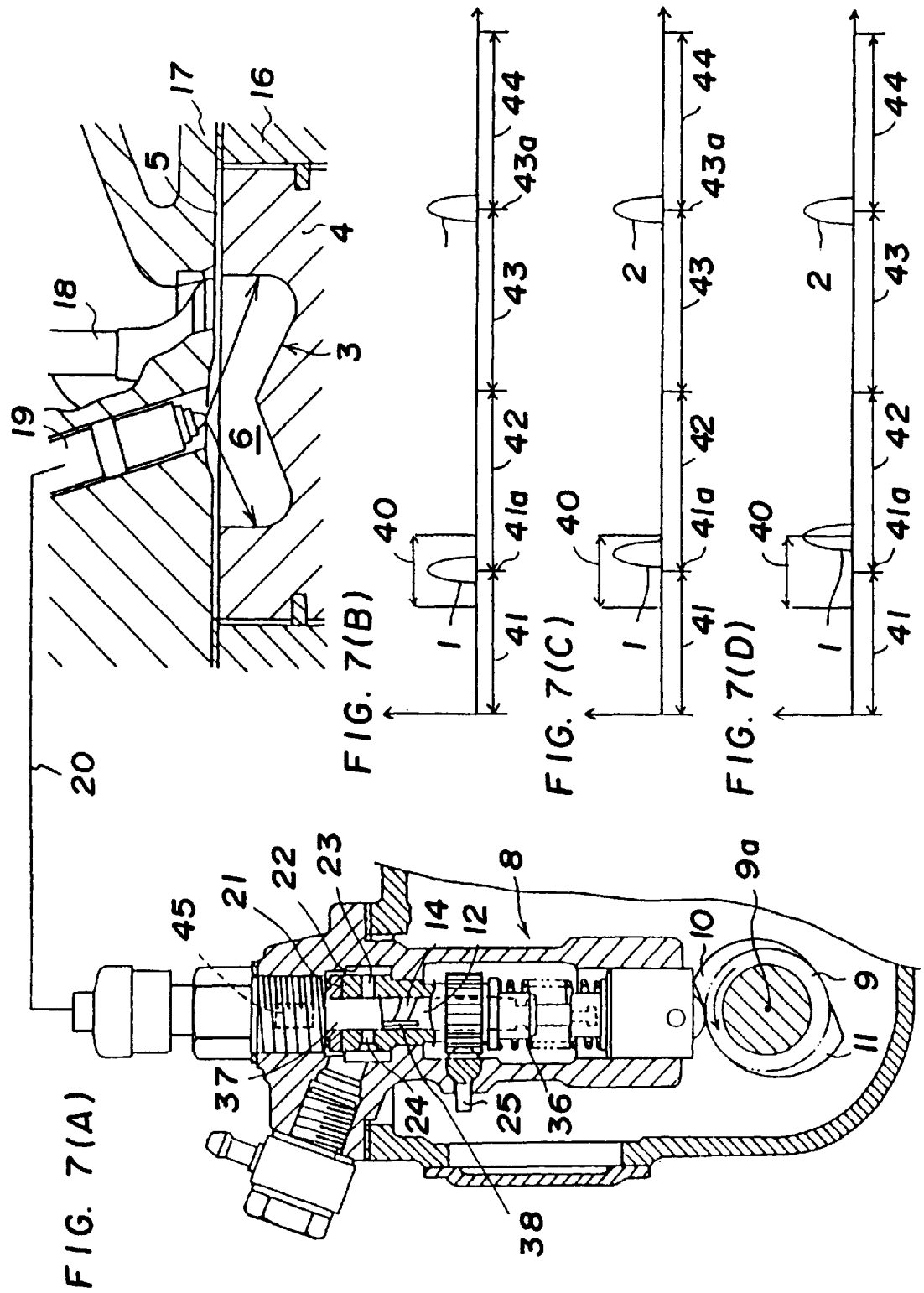

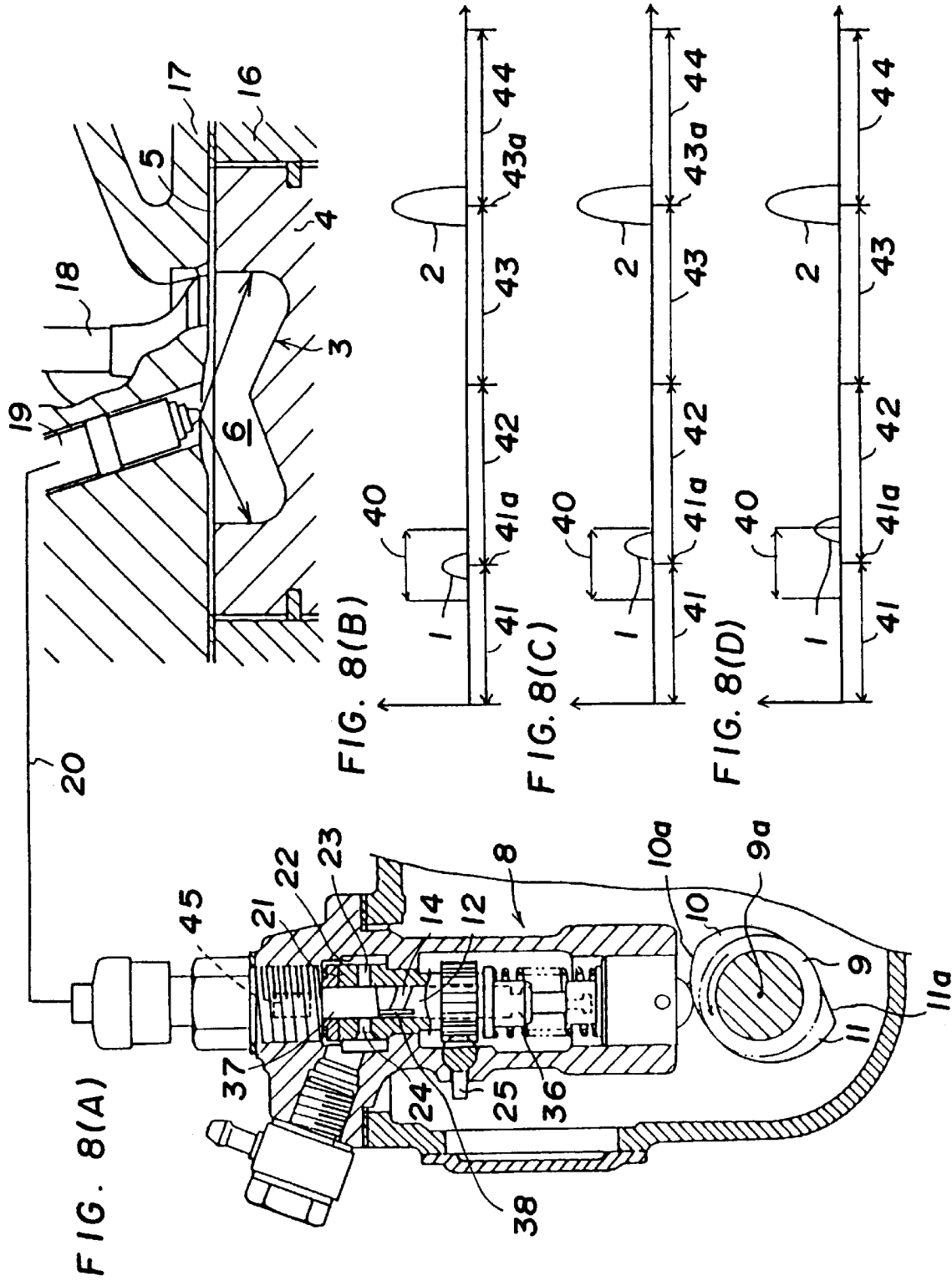

FUEL INJECTION DEVICE FOR DIESEL ENGINE

BACKGROUND OF THE INVENTION

1. Technical Field

The present invention relates to a fuel injection device for a diesel engine.

2. Description of the Earlier Technology

Conventionally, there has been existing a fuel injection device for a diesel engine of such a type that conducts a preliminary injection and a main injection directly to a combustion chamber. This device performs the preliminary injection prior to the main injection so as to improve the combustion.

Patent Public Disclosure No. 10-18940 discloses one of the fuel injection devices of this type. This device begins the preliminary injection at an initial time of an intake stroke after an exhaust valve has closed to form in a combustion chamber a diluted fuel-air mixture, into which the main injection is carried out. This device performs the preliminary injection to form the diluted fuel-air mixture, thereby shortening the ignition lag of a main injection fuel. Thus it attempts to reduce NOx and exhaust amount of black smoke.

The above conventional technique begins the preliminary injection at the initial time of the intake stroke after the exhaust valve has closed. Therefore, it has the following problems.

During this term, intake air is rapidly introduced to lower the temperature of a gas within the combustion chamber quickly. If the preliminary injection is performed to this gas of low temperature within the combustion chamber, a preliminary injection fuel does not vaporize soon and therefore adheres to an inner surface of the combustion chamber as it remains liquid. This liquid preliminary injection fuel commences to vaporize with compression heat produced at a compression stroke. However, it cannot completely vaporize only with the compression heat. Accordingly, before it becomes a preliminary fuel-air mixture and spreads over the whole combustion chamber, the main injection is performed. Thus, needless to say, the aimed effect cannot be attained. Besides, unburnt fuel or gas increases in exhaust amount to deteriorate consumption accordingly.

SUMMARY OF THE INVENTION

The present invention has an object to solve the foregoing problems.

The invention as defined in claim 1 is constructed as follows (see FIG. 1, FIG. 3, FIG. 4, FIG. 7 or FIG. 8).

In a fuel injection device for a diesel engine adapted to perform a preliminary injection 1 and a main injection 2 directly to a combustion chamber 3, the preliminary injection 1 is adjusted to begin within a valve overlap term 40.

The invention of claim 1 presents the following function and effect (see FIG. 1, FIG. 3, FIG. 4, FIG. 7 or FIG. 8).

The preliminary injection 1 being adjusted to begin within the valve overlap term 40, it produces the following advantages.

Within the term 40, no intake air is introduced into the combustion chamber 3 or only a little if any and therefore the combustion chamber 3 contains a gas of high temperature. If the preliminary injection 1 is conducted to this gas of high temperature within the combustion chamber 3, a preliminary injection fuel vaporizes soon. The vaporized preliminary injection fuel is dispersed by intake air rapidly introduced into the combustion chamber 3 after the elapse of the valve overlap term 40 to become a preliminary fuel-air mixture, which spreads over the whole combustion chamber. And it brings about a low temperature oxidation reaction (pre-combustion reaction) during a compression stroke to form an atmosphere extremely easy to ignite within the combustion chamber 3. If the main injection 2 is performed in this atmosphere, it aids in igniting a main injection fuel to shorten the ignition lag and also accelerate the combustion after the ignition. Further, it improves the mixing of fuel with air to result in increasing the rate of utilizing the intake air. For these reasons, it is possible to reduce the exhaust amount of unburnt fuel or gas and decrease the consumption accordingly. Additionally, heat efficiency as well as output is improved and exhausted smoke becomes clean. At the same time, vibration and noise are decreased to result in securing a smooth operation.

The invention of claim 2 presents the following function and effect in addition to those presented by the invention of claim 1 (see FIG. 1(B), FIG. 3(B), FIG. 4(B), FIG. 7(B) or FIG. 8(B)).

The preliminary injection 1 being adjusted to begin before a top dead center 41a of an exhaust stroke 41, it produces the following advantage.

Before the top dead center 41a, no intake air is introduced into the combustion chamber 3 and the combustion chamber 3 contains a gas of extremely high temperature with the result of vaporizing the preliminary injection fuel sooner.

The invention of claim 3 presents the following function and effect in addition to those presented by the invention of claim 1 (see FIGS. 1(C) and 1(D), FIGS. 3(C) and 3(D), FIGS. 4(C) and 4(D), FIGS. 7(C) and 7(D) or FIGS. 8(C) and 8(D)).

The preliminary injection 1 being adjusted to begin after the top dead center 41a of the exhaust stroke 41, it produces the following advantage.

After the top dead center 41a, an exhaust valve is gradually approaching to a completely closed state, which inhibits the preliminary injection fuel injected into the combustion chamber 3 from blowing through an exhaust port as it remains unburnt. This can particularly enhance the effect of reducing the exhaust amount of the unburnt fuel.

The invention of claim 4 presents the following function and effect in addition to those presented by claim 1 (see FIGS. 1(B) and 1(C), FIGS. 3(B) and 3(C), FIGS. 4(B) and 4(C), FIGS. 7(B) and 7(C) or FIGS. 8(B) and 8(C)).

The preliminary injection 1 being adjusted to end within the valve overlap term 40, it produces the following advantage.

Within the term 40, no intake air is introduced into the combustion chamber 3 or a little if any and therefore the combustion chamber contains a gas of higher temperature with the result of vaporizing the preliminary injection fuel sooner.

The invention of claim 5 presents the following function and effect in addition to those presented by claim 1 (see FIG. 1(D), FIG. 3(D), FIG. 4(D), FIG. 7(D) or FIG. 8(D)).

The preliminary injection 1 being adjusted to end after the elapse of the valve overlap term 40, it produces the following advantage.

After the elapse of the term 40, intake air is rapidly introduced into the combustion chamber 3 to lower the temperature of the gas present in the combustion chamber 3. The preliminary injection fuel injected into this gas of low temperature within the combustion chamber 3 during an ending term of the injection is prevented from vaporizing to enhance the filling efficiency of the intake air. Therefore, incomplete combustion hardly occurs to particularly enhance the effect of inhibiting the production of black smoke. The preliminary injection fuel inhibited from vaporizing during the ending term of injection is vaporized with compression heat generated during the compression stroke and presented for combustion.

The invention of claim 6 presents the following function and effect in addition to those presented by claim 1 (see FIG. 1, FIG. 3, FIG. 4 or FIG. 8).

When making a comparison with the same load, the preliminary injection 1 gets smaller than the main injection 2 in amount to result in hardly causing preignition and therefore being able to obtain appropriate output. Further, it is possible to inhibit the knocking caused by spontaneous ignition of the preliminary injection fuel.

The invention of claim 7 presents the following function and effect in addition to those presented by claim 1 (see FIGS. 1 to 6).

Since the preliminary injection 1 is not conducted in a low load zone, it presents the following advantage.

The low load zone necessitates to reduce the total injection amount of fuel. Therefore, provided that the preliminary injection 1 is performed in this zone, the preliminary injection 1 shares a small amount of injection fuel with the main injection 2 to result in rendering the fuel-air mixture made by the preliminary injection 1 so thin and besides the combustion heat produced by the main injection 2 so low that flame propagation is delayed. This causes a disadvantage that the fuel-air mixture made by the preliminary injection 1 is discharged as it remains unburnt. On the other hand, such an disadvantage can be avoided unless the preliminary injection 1 is performed in the low load zone.

The invention of claim 8 presents the following function and effect in addition to those presented by the invention of claim 7 (see FIGS. 1 to 6).

The preliminary injection 1 is not performed in the low load zone and its amount gradually approaches to '0' (zero) as the load decreases in middle and high load zones. This produces the following advantage.

The preliminary injection amount does not abruptly change in the vicinity of a boundary between the low load zone and the middle and high load zones. Accordingly, the rotation speed of the engine hardly hunts.

The invention of claim 9 presents the following function and effect in addition to those presented by the invention of claim 1 (see FIG. 1(A), FIG. 3(A), FIG. 4(A), FIG. 7(A) or FIG. 8(A)).

The preliminary injection 1 and the main injection 2 are performed directly to a main combustion chamber 3 through a fuel injection pipe 20 connected to a fuel injection pump 8 and a fuel injection nozzle 19 connected to the fuel injection pipe 20. This produces the following advantage.

The preliminary injection 1 and the main injection 2 are conducted through a single injection route to thereby simplify the construction of the fuel injection device with the result of reducing the cost for manufacturing it and making it hardly get out of order.

The invention of claim 10 presents the following function and effect in addition to those presented by claim 1 (see FIG. 1(A), FIG. 3(A), FIG. 4(A), FIG. 7(A) or FIG. 8(A)).

A fuel injection cam 9 is provided with a projection 10 for the preliminary injection 1 and a projection 11 for the main injection 2, so that it can be manufactured by additionally forming the preliminary injection projection 10 onto an existing fuel injection cam and besides the manufacturing can be done with ease. Further, the preliminary injection projection 10 is opposed to the main injection projection 11 with a rotation center of the fuel injection cam 9 interposed therebetween. Therefore, they can be arranged sufficiently apart from each other, which results in a possibility of easily designing and manufacturing a cam profile of the fuel injection cam 9.

The invention of claim 11 can present the following function and effect in addition to those presented by the invention of claim 10 (see FIGS. 2(C) and 2(D)).

A ported fuel injection pump 8 is used and its plunger 12 has an preliminary injection effective stroke 29 increasing as the load increases. This produces the following advantage.

The fuel injection pump 8 is adapted to let go a fuel within a plunger chamber 37 through a spill port 23 during a press stroke of the plunger 12. As the rotation speed of the engine decreases, the spill amount increases. At the end of the press stroke, the plunger chamber 37 contains the fuel having an oil pressure reduced. Without compensating this reduction of the oil pressure, as a segment 30 indicates in FIG. 2(E), the preliminary injection 1 is stopped at a stage where the rotation speed of the engine has decreased to a middle speed rotation 26. On the other hand, according to the present invention, when the increase of the load reduces the rotation speed of the engine, the plunger 12 has the effective stroke 29 increased to compensate the reduction of the fuel oil pressure. Accordingly, as a segment 31 shows in FIG. 2(E), the preliminary injection 1 is maintained till a low speed rotation 27. Thus it can continue to retain a function of enhancing the output while inhibiting the production of black smoke until a lower speed rotation zone.

Further, as shown by FIGS. 2(C) and 2(D), the plunger 12 has the effective stroke 29 progressively reduced as the load decreases. This produces the following advantage.

As the segment 31 shows in FIG. 2(E), when the engine rotates at a high speed, the preliminary injection 1 is stopped early at a stage where the engine load has decreased to a middle load 33. Without this function, as the segment 30 indicates in FIG. 2(E), the preliminary injection 1 continues till a low load 32. Thus, contrary to this case, the present invention can reduce the consumption and the exhaust amount of HC.

The invention of claim 12 presents the following function and effect in addition to those presented by the invention of claim 10 (see FIGS. 4 to 8).

Both the preliminary injection 1 and the main injection 2 end by letting go the fuel within the plunger chamber 37 through the spill port 23 into a fuel sump chamber 22 to result in producing the following advantage.

The preliminary injection 1 being coincident with the main injection 2 in ending conditions, it is possible to prevent such a defect that a residual pressure of the fuel injection pipe 20 lowers when the preliminary injection 1 ends. This can prohibit a failure of injection or an improper injection timing attributable to the above defect and therefore assure a smooth operation.

An injection amount required during one cycle is divided into the preliminary injection 1 and the main injection 2 to result in decreasing a fuel discharge amount for one injection of the fuel injection pump 8. Thus the fuel injection pump 8 can fulfil the intended purpose even if it is small in size and capacity as well as inexpensive.

When the preliminary injection 1 and the main injection 2 end, the oil pressure of the fuel within the plunger chamber 37 lowers immediately and also a retraction valve 45 closes soon. This can prevent after-dripping of the fuel from the fuel injection nozzle 19 after the fuel has been injected.

The invention of claim 13 presents the following function and effect in addition to those presented by the invention of claim 12 (see FIG. 5 or FIG. 6).

A main port 23a and a sub port 23b are used as the spill port 23. On making a comparison with the same load, the fuel escapes through the sub port 23b when performing the preliminary injection 1 in an amount larger than when conducting the main injection 2. This can make the preliminary injection amount less than the main injection amount by a simple structure.

The invention of claim 14 presents the following function and effect in addition to those present by claim 1 (see FIG. 5 or FIG. 6).

Since the preliminary injection 1 is not performed in a starting zone, the following advantage is produced.

In the event that the preliminary injection 1 is performed in the starting zone, the preliminary injection fuel vaporizes to cool the combustion chamber 3, which results in failing to smoothly start the engine. Such a disadvantage can be avoided unless the preliminary injection 1 is performed in the starting zone.

The invention of claim 15 presents the following function and effect in addition to those presented by the invention of claim 10 (see FIGS. 4 to 8).

The preliminary injection projection 10 lifts the plunger 12 of the fuel injection pump 8 at a maximum lift length substantially identical to that at which the main injection projection 11 lifts it. This produces the following advantage.

The ending conditions of the preliminary injection 1 are made substantially identical or extremely close to those of the main injection 2. Therefore, the retraction valve 45 retracts the fuel at the end of the preliminary injection 1 in conditions substantially identical or extremely close to those in which it does at the end of the main injection 2. Therefore, it is possible to prevent the defect that the residual pressure of the fuel injection pipe decreases when the preliminary injection ends. This can prohibit the failure of injection or the improper injection timing attributable to such defect and assure a smooth operation.

The injection amount required during one cycle is divided into the preliminary injection 1 and the main injection 2, which results in decreasing the fuel discharge amount for one injection of the fuel injection pump 8. Thus the fuel injection pump 8 can fulfil the intended purpose even if it is small in size and capacity as well as inexpensive.

The invention of claim 16 presents the following function and effect in addition to those presented by the invention of claim 15 (see FIG. 7).

The preliminary injection projection 10 is formed in substantially the same shape as that of the main injection projection 11 to make the preliminary injection amount substantially identical to the main injection amount with the result of producing the following advantage.

In the case where the preliminary injection amount is larger than the main injection amount, the preignition easily occur and therefore appropriate output cannot be obtained. Further, the preliminary injection fuel spontaneously ignites to easily cause the knocking. On the other hand, in the event that the preliminary injection fuel becomes substantially identical to the main injection fuel in amount, such a disadvantage hardly occurs.

It is sufficient to additionally form onto an existing fuel injection cam 9 provided with an injection projection 11, a preliminary injection projection 10 substantially the same as the projection 11 in shape. Therefore, it is possible to readily design the fuel injection cam 9 and manufacture it at a low cost.

The invention of claim 17 presents the following function and effect in addition to those presented by the invention of claim 15 (see FIG. 8).

The preliminary injection projection 10 lifts the plunger 12 at a speed set lower than that at which the main injection projection 11 lifts it. Therefore, the preliminary injection amount becomes less than the main injection amount, which results in more efficiently inhibiting the preignition or the knocking.

BRIEF DESCRIPTION OF THE DRAWINGS

FIG. 1 is a view explaining a fuel injection device for a diesel engine according to a first embodiment of the present invention. FIG. 1(A) is a vertical sectional view. FIG. 1(B) to FIG. 1(D) explain various set states of injection timing;

FIG. 2 is a view explaining a plunger to be used for the fuel injection device of FIG. 1. FIG. 2(A) is a perspective view of a principal part of the plunger. FIG. 2(B) is a developed view of a peripheral surface of the plunger. FIG. 2(C) is a perspective view of a principal part of another plunger. FIG. 2(D) is a developed view of a peripheral surface of another plunger. FIG. 2(E) explains respective preliminary injection zones forming when the respective plungers are employed;

FIG. 3 is a view explaining a fuel injection device for a diesel engine according to a second embodiment of the present invention. FIG. 3(A) to FIG. 3(D) correspond to FIG. 1(A) to FIG. 1(D);

FIG. 4 is a view explaining a fuel injection device for a diesel engine according to a third embodiment of the present invention. FIG. 4(A) to FIG. 4(D) correspond to FIG. 1(A) to FIG. 1(D);

FIG. 5 is a view explaining a plunger to be used for the fuel injection device shown in FIG. 4. FIG. 5(A) is a developed view of a peripheral surface of the plunger. FIG. 5(B) is a plan view of the plunger. FIG. 5(C) is a side view of the plunger. FIG. 5(D) is a vertical sectional view of a barrel having the plunger internally fitted thereinto;

FIG. 6 is a view explaining another plunger to be used for the fuel injection device of FIG. 4. FIG. 6(A) to FIG. 6(D) correspond to FIG. 5(A) to FIG. 5(D);

FIG. 7 is a view explaining a fuel injection device for a diesel engine according to a fourth embodiment of the present invention. FIG. 7(A) to FIG. 7(D) correspond to FIG. 1(A) to FIG. 1(D); and FIG. 8 is a view explaining a fuel injection device for a diesel engine according to a fifth embodiment of the present invention. FIG. 8(A) to FIG. 8(D) correspond to FIG. 1(A) to FIG. 1(D).

PREFERRED EMBODIMENTS OF THE INVENTION

Embodiments of the present invention will be explained with reference to the attached drawings. FIGS. 1 and 2 explain a first embodiment of the present invention. This first embodiment utilizes a multicylinder engine of direct injection type.

This engine is constructed as follows.

As shown in FIG. 1(A), a piston 4 is internally fitted into a cylinder 16. This piston 4 has a top surface 5 provided with a cavity 6. The cavity 6 has an internal space formed as a combustion chamber 3. A cylinder head 17 is assembled to the cylinder 16. A fuel injection nozzle 19 is attached to the cylinder head 17. In FIG. 1(A) numeral 18 designates an intake valve.

A fuel injection device for this engine is constructed as follows.

As shown in FIG. 1(A), connected to a fuel injection pump 8 is a fuel injection pipe 20, which has a front end connected to a fuel injection nozzle 19 so as to perform a preliminary injection 1 and a main injection 2. The preliminary injection 1 and the main injection 2 are both performed directly to the combustion chamber 3. The preliminary injection 1 and the main injection 2 are adjusted to be conducted to the combustion chamber 3 through the fuel injection pipe 20 connected to the fuel injection pump 8 and the fuel injection nozzle 19 connected to the fuel injection pipe 20. The preliminary injection 1 and the main injection 2 are performed toward the internal area of the cavity 6. This inhibits the washing of lubricant on an inner peripheral surface of the cylinder 16 to prevent the piston 4 from seizing.

A fuel injection timing is as follows.

Although it is set as shown in FIG. 1(B), it may be set as shown in FIG. 1(C) or FIG. 1(D). With each of the settings shown in FIG. 1(B) to FIG. 1(D), the main injection 2 is performed in the vicinity of a top dead center 43a of a compression stroke 43 and the preliminary injection 1 begins within a valve overlap term 40. Among them, in the case of the setting shown in FIG. 1(B), the preliminary injection 1 beings before a top dead center 41a of an exhaust stroke 41. In the case of the settings shown in FIGS. 1(C) and 1(D), the preliminary injection 1 begins after the top dead center 41a of the exhaust stroke 41. In the case of the settings shown in FIGS. 1(B) and 1(C), the preliminary injection 1 ends within the valve overlap term 40. In the case of the setting shown in FIG. 1(D), the preliminary injection 1 ends after the elapse of the valve overlap term 40. The valve overlap term 40 is set to a range of every 12 degrees in crank angle before and after the top dead center 41a of the exhaust stroke 41. In FIG. 1(B) to FIG. 1(D) numerals 42 and 44 indicate an intake stroke and an expansion stroke, respectively. Further, the ordinate indicates an injection rate.

As shown in FIG. 1(B) to FIG. 1(D), when making a comparison with the same load, the preliminary injection amount becomes less than the main injection amount. The preliminary injection amount is preferably 2 to 25% of the total amount of the preliminary injection 1 and the main injection 2. With the preliminary injection amount of below 2%, the combustion chamber 3 produces a fuel-air mixture too thin to shorten the ignition lag of the main injection 2. When it exceeds 25%, the combustion chamber 3 produces a fuel-air mixture so thick that the preignition is likely to occur. On the other hand, with the preliminary injection amount within the range of 2 to 25%, such problems hardly occur. Therefore, in order to avoid those problems, the preliminary injection amount is more preferably 5 to 20%. Besides, as shown in FIG. 2(E), the preliminary injection 1 is not performed in a low load zone. Further, in middle and high load zones, as the load gets smaller, the preliminary injection amount gradually approaches to '0' (zero).

The fuel injection pump 8 is constructed as follows.

As shown in FIG. 1(A), the fuel injection pump 8 is an in-line ported pump. A plunger 12 is internally fitted into a barrel 21. The plunger 12 is lifted by a fuel injection cam 9 and returned by a return spring 36. There is provided a plunger chamber 37 on a side toward which the plunger 12 is lifted. The barrel 21 is provided with a fuel sump chamber 22 therearound and has a peripheral wall provided with a fuel inlet 24 and a spill port 23, through which the plunger chamber 37 is communicated with the fuel sump chamber 22. The plunger 12 is provided with an inclined groove 14, which is communicated with the plunger chamber 37 through a vertical groove 38. The barrel 21 is interlockingly connected to a governor portion through a fuel metering rack 25. A fuel injection cam 9 is provided with a projection 10 for the preliminary injection 1 and a projection 11 for the main injection 2. The preliminary injection projection 10 is opposed to the main injection projection 11 with a rotation center 9a of the fuel injection cam 9 interposed therebetween.

When the plunger 12 has been lifted by the main injection projection 11 of the cam 9 and thereafter is returned by the return spring 36, the plunger chamber 37 within the barrel 21 falls into a negative pressure to suck a fuel within the sump chamber 22 into the plunger chamber 37 through the inlet 24. When the plunger 12 is lifted from a bottom dead center by the preliminary injection projection 10 to close the inlet 24 and the spill port 23 with its peripheral surface, the preliminary injection 1 begins. The preliminary injection projection 10 thrusts forth at so short a length that the plunger 12 finishes lifting before the inclined groove 14 reaches the spill port 23 to complete the preliminary injection 1.

Next, when the fuel has been sucked into the plunger chamber 37 and thereafter the plunger 12 is lifted from the bottom dead center by the main injection projection 11 to close the inlet 24 and the spill port 23 with its peripheral surface, the main injection 2 begins. And when the inclined groove 14 reaches the spill port 23, the fuel within the plunger 37 escapes into the fuel sump chamber 22 through the vertical groove 38, the inclined groove 14 and the spill port 23 in order to complete the main injection 2. Subsequently, the same operations are repeated.

As the load applied on an engine decreases, the engine rotates at an increased speed. Consequently, the barrel 21 is interlockingly rotated from the governor portion toward a fuel decreasing direction through the fuel metering rack 25. Conversely, as the load applied on the engine increases, the barrel 21 is interlockingly rotated toward a fuel increasing direction.

The plunger 12 is constructed as follows.

One kind usable as the plunger 12 is shown in FIGS. 2(A) and 2(B), but it may be another kind as shown in FIGS. 2(C) and 2(D). The plunger 12 as shown in FIGS. 2(A) and 2(B) has a peripheral surface provided with an upper (in the lifting direction) end edge 13 including a portion 13a for middle and high loads and a portion 3b for a low load. The portion 13a is formed in continuity with the portion 13b with no stepped portion provided therebetween in a direction substantially perpendicular to the lifting direction of the plunger 12.

With this plunger 12, although a preliminary injection effective stroke 29 becomes constant regardless of high or low load, the preliminary amount increases as the load gets higher as well as the main injection amount, for the following reasons.

The higher the load, the more the main injection amount to get the residual pressure within the fuel injection pipe higher. Further, as the load gets higher, during the effective stroke 29 the inclined groove 14 is separated further from the spill port 23. Thus less fuel leaks out of the inclined groove 14 into the spill port 23 through a clearance provided between the peripheral surface of the plunger 12 and a peripheral surface of the barrel 21. For these reasons, as the load gets higher, the preliminary injection amount increases.

The plunger 12 shown in FIGS. 2(C) and 2(D) has a peripheral surface provided with an upper end edge 13 including a portion 13b for the low load and a portion 13a for the middle and high loads. The portion 13b is substantially perpendicular to the lifting direction of the plunger 12. The portion 13a upwardly inclines from an end of the portion 13b toward the lifting direction of the plunger 12. Thus while the preliminary injection effective stroke 29 of the plunger 12 is adapted to increase as the load increases, it decreases as the load decreases. The inclined groove 14 has an upper (in the lifting direction) end edge 15 including a portion 15a for the middle and high loads. The portion 15a is offset to the lifting direction of the plunger 12 from an imaginary line 15c of a low load portion 15b extending toward the middle and high load side. This aims at adjusting a disadvantage that a main injection effective stroke increases too much only by inclining the middle and high load portion 13a of the upper end edge 13.

FIG. 2(E) shows preliminary injection zones forming when the respective plungers 12 are employed. In the case of the plunger shown in FIGS. 2(A) and 2(B), a preliminary injection zone forms above a segment 30 indicating the lower limit. In the case of the plunger shown in FIGS. 2(C) and 2(D), a preliminary injection zone forms above a segment 31 indicating the lower limit.

The first embodiment utilizes a direct injection type as a combustion chamber 3. But a second embodiment shown in FIG. 3 uses a divided type. The combustion chamber 3 of this type comprises a main combustion chamber 3a and a divided combustion chamber 3b. These chambers 3a and 3b are communicated with each other through an injection hole 3c. The divided chamber 3b is formed as a swirl chamber. The fuel injection nozzle 19 faces the divided chamber 3b. The other construction and function are the same as those of the first embodiment. In FIG. 3 the same elements as those in the first embodiment are designated by the same characters.

A third embodiment shown in FIGS. 4 to 6 constructs a fuel injection device as follows.

As shown in FIG. 4(A), the fuel injection cam 9 has the preliminary injection projection 10 and the main injection projection 11 substantially identical to each other in a maximum lift length. Both of the preliminary injection 1 and the main injection 2 end by letting go the fuel within the plunger chamber 37 into the fuel sump chamber 22 through the spill port 23.

The fuel injection pump 8 is constructed as follows.

As shown in FIG. 5(D), a main port 23a and a sub port 23b are used for the spill port 23. The sub port 23b is smaller than the main port 23a. The fuel within the plunger chamber 37 is adapted to escape into the fuel sump chamber 22 through the sub port 23b during a stroke 46 while the main port 23a is being closed with the peripheral surface of the plunger 12 till it is opened by the inclined groove 14 of the plunger 12.

The fuel injection cam 9 is constructed as follows.

As shown in FIG. 4(A), the preliminary injection projection 10 for lifting the plunger 12 has a lifting surface 10a ascending from a basic circle more moderately than a lifting surface 11a of the main injection projection 11. Thus the preliminary injection projection 10 lifts the plunger 12 at a speed set lower than that at which the main injection projection 11 lifts it. As the lifting speed gets lower and lower, the more fuel escapes through the sub port 23b to result in making the preliminary injection amount less than the main injection amount.

The plunger 12 is constructed as follows.

FIG. 5 shows one kind used here as the plunger 12. But it may be another kind shown in FIG. 6.

The plunger 12 of FIG. 5 has a peripheral surface including an upper (in the lifting direction) end edge portion provided with a cutout 50. Therefore, as shown in FIG. 5(D), at a starting time of the stroke 46, the cutout 50 prevents the sub port 23b from closing to let go the fuel through the sub port 23b. This plunger 12 can be easily manufactured by forming a simple cutout 50 in an existing one.

The plunger 12 of FIG. 6 has a peripheral surface including an upper (in the lifting direction) end edge 13. A groove 34 is provided at a position offset from the end edge 13 to an anti-lifting direction. Thus the sub port 23b closed with the peripheral surface of the plunger 12 during the stroke 46 is opened by the groove 34 at an ending time of the stroke 46. At this time, the fuel escapes through the sub port 23b. The plunger 12 of FIG. 6 can inhibit a delay of the beginning time of the preliminary injection 1 when compared with that of FIG. 5. This plunger 12 can be easily manufactured by forming a simple groove 34 in an existing one. The cutout 50 and the groove 34 provided in the respective plungers shown in FIGS. 5 and 6 are each increased in width of the lifting direction in a starting zone to thereby prevent the preliminary injection 1 from being performed in the starting zone.

In the third embodiment, the other construction and function are made the same as those of the first embodiment. The same elements are designated by the same characters in FIGS. 4 to 6. In FIGS. 5(A) and 6(A), numerals 47, 48 and 49 indicate a starting position, a rated load and a fuel injection position, respectively.

A fourth embodiment shown in FIG. 7 and a fifth embodiment shown in FIG. 8 are coincident with the third embodiment on the following points.

The fuel injection cam 9 has the preliminary injection projection 10 and the main injection projection 11 substantially identical to each other in the maximum lift length. Both the preliminary injection 1 and the main injection 2 end by letting go the fuel within the plunger chamber 37 into the fuel sump chamber 22 through the spill port 23.

However, the fourth and fifth embodiments differ from the third embodiment in that the used spill port 23 is a one-piece unit and the plunger 12 is the same as that shown in FIGS. 2(A) and 2(B). The fourth embodiment is different from the third embodiment in that the preliminary injection projection 10 is substantially identical to the main injection projection 11 in shape. In the fourth embodiment, when making a comparison with the same load, the preliminary injection amount is the same as the main injection amount. In the fifth embodiment, the preliminary injection projection 10 is distinct from the main injection projection 11 in shape like in the third embodiment. Thus the preliminary injection projection 10 lifts the plunger 12 at a speed set lower than that at which the main injection projection 11 lifts it. In the fifth embodiment, when making a comparison with the same load, the preliminary injection amount becomes less than the main injection amount.

The other construction and function are the same as those of the third embodiment. In FIGS. 7 and 8 the same elements as those of the third embodiment are indicated by the same characters.

What is claimed is:

1. A fuel injection device for a diesel engine comprising:
 a fuel injection pipe (20) connected to a fuel injection pump (8); and
 a fuel injection nozzle (19) connected to the fuel injection pipe (20), the fuel injection nozzle (19) being attached to a cylinder head (17) so that the fuel injection device is adapted to perform a preliminary injection (1) and a main injection (2) directly into a combustion chamber (3) through the fuel injection nozzle (19);
 wherein the preliminary injection (1) is adjusted to begin within a valve overlap term (40) but not to be performed in a low load zone.

2. A fuel injection device for a diesel engine according to claim 1, wherein the preliminary injection (1) is further adjusted to begin before a top dead center (41a) of an exhaust stroke (41).

3. A fuel injection device for a diesel engine according to claim 1, wherein the preliminary injection (1) is further adjusted to begin after a top dead center (41a) of an exhaust stroke (41).

4. A fuel injection device for a diesel engine according to claim 1, wherein the preliminary injection (1) is further adjusted to end within the valve overlap term (40).

5. A fuel injection device for a diesel engine according to claim 1, wherein the preliminary injection (1) is further adjusted to end after the elapse of the valve overlap term (40).

6. A fuel injection device for a diesel engine according to claim 1, wherein when making a comparison with the same load, the preliminary injection (1) becomes less than the main injection (2) in amount.

7. A fuel injection device for a diesel engine according to claim 1, wherein a preliminary injection amount gradually approaches zero as the load decreases, in middle and high load zones.

8. A fuel injection device for a diesel engine according to claim 1, further comprising:
 a fuel injection cam (9) provided with a projection (10) for the preliminary injection (1) and a projection (11) for the main injection (2), the preliminary injection projection (10) being opposed to the main injection projection (11) with a rotation center (9a) of the cam (9) interposed therebetween.

9. A fuel injection device for a diesel engine according to claim 8, wherein the fuel injection pump (8) is ported and provided with a plunger (12) having a peripheral surface including an upper, in a lifting direction, end edge (13) which comprises a portion (13a) for middle and high loads and a portion (13b) for a low load, the middle and high load portion (13a) upwardly inclining from an end of the low load portion (13b) in the lifting direction of the plunger (12); and
 wherein a preliminary injection effective stroke (29) of the plunger (12) is adjusted to increase as the load increases and to decrease as the load decreases.

10. A fuel injection device for a diesel engine according to claim 8, wherein the fuel injection pump (8) is ported and provided with a plunger chamber (37); and
 wherein both the preliminary injection (1) and the main injection (2) end by letting go a fuel within the plunger chamber (37) into a fuel sump chamber (22) through a spill port (23).

11. A fuel injection device for a diesel engine according to claim 10, wherein a main port (23a) and a sub port (23b) are utilized as the spill port (23), the sub port (23b) being smaller than the main port (23a), the fuel within the plunger chamber (37) being arranged to escape through the sub port (23b) into the fuel sump chamber (22) during a stroke (46) while the main port (23a) is being closed with a peripheral surface of a plunger (12) till it is opened by a inclined groove (14) of the plunger (12); and
 wherein when making a comparison with the same load, the fuel escapes through the sub port (23b) when performing the preliminary injection (1) in amount larger than when performing the main injection (2) by setting a speed at which the preliminary injection projection (10) lifts the plunger (12) lower than that at which the main injection projection (11) lifts it.

12. A fuel injection device according to claim 8, wherein the preliminary injection projection (10) lifts a plunger (12) of the fuel injection pump (8) at a maximum lift length substantially identical to that at which the main injection projection (11) lifts it.

13. A fuel injection device for a diesel engine according to claim 12, wherein the preliminary injection projection (10) is substantially the same as the main injection projection (11) in shape.

14. A fuel injection device for a diesel engine according to claim 12, wherein the preliminary injection projection (10) is different from the main injection projection (11) in shape; and
 wherein the preliminary injection projection (10) lifts the plunger (12) at a speed set lower than that at which the main injection projection (11) lifts it.

15. A fuel injection device for a diesel engine according to claim 1, wherein the preliminary injection (1) is not performed in a starting zone.

16. A fuel injection device for a diesel engine comprising:
 a fuel injection pipe (20) connected to a ported fuel injection pump (8) provided with a plunger (12) having a peripheral surface including an upper, in a lifting direction, end edge (13) which comprises a portion (13a) for middle and high loads and a portion (13b) for a low load, the middle and high load portion (13a) upwardly inclining from an end of the low load portion (13b) in the lifting direction of the plunger (12); and
 a fuel injection nozzle (19) connected to the fuel injection pipe (20), the fuel injection nozzle (19) being attached to a cylinder head (17) so that the fuel injection device is adapted to perform a preliminary injection (1) and a main injection (2) directly into a combustion chamber (3) through the fuel injection nozzle (19);
 wherein the preliminary injection (1) is adjusted to begin within a valve overlap term (40), and wherein a preliminary injection effective stroke (29) of the plunger (12) is adjusted to increase as the load increases and to decrease as the load decreases, injection (2) directly into a combustion chamber (3) through the fuel injection nozzle (19);
 wherein the preliminary injection (1) is adjusted to begin within a valve overlap term (40), and wherein a preliminary injection effective stroke (29) of the plunger (12) is adjusted to increase as the load increases and to decrease as the load decreases.

17. A fuel injection device for a diesel engine according to claim 16, wherein the preliminary injection (1) is further adjusted to begin before a top dead center (41a) of an exhaust stroke (41).

18. A fuel injection device for a diesel engine according to claim 16, wherein the preliminary injection (1) is further adjusted to begin after a top dead center (41a) of an exhaust stroke (41).

19. A fuel injection device for a diesel engine according to claim 16, wherein the preliminary injection (1) is further adjusted to end within the valve overlap term (40).

20. A fuel injection device for a diesel engine according to claim 16, wherein the preliminary injection (1) is further adjusted to end after the elapse of the valve overlap term (40).

21. A fuel injection device for a diesel engine according to claim 16, wherein when making a comparison with the same load, the preliminary injection (1) becomes less than the main injection (2) in amount.

22. A fuel injection device for a diesel engine according to claim 16, wherein the preliminary injection (1) is not performed in a low load zone.

23. A fuel injection device for a diesel engine according to claim 22, wherein a preliminary injection amount gradually approaches zero as the load decreases, in middle and high load zones.

24. A fuel injection device for a diesel engine according to claim 16, further comprising:
a fuel injection cam (9) provided with a projection (10) for the preliminary injection (1) and a projection (11) for the main injection (2), the preliminary injection projection (10) being opposed to the main injection projection (11) with a rotation center (9a) of the cam (9) interposed therebetween.

25. A fuel injection device for a diesel engine according to claim 24, wherein the fuel injection pump (8) is ported and provided with a plunger chamber (37); and
wherein both the preliminary injection (1) and the main injection (2) end by letting go a fuel within the plunger chamber (37) into a fuel sump chamber (22) through a spill port (23).

26. A fuel injection device for a diesel engine according to claim 25, wherein a main port (23a) and a sub port (23b) are utilized as the spill port (23), the sub port (23b) being smaller than the main port (23a), the fuel within the plunger chamber (37) being arranged to escape through the sub port (23b) into the fuel sump chamber (22) during a stroke (46) while the main port (23a) is being closed with a peripheral surface of a plunger (12) till it is opened by a inclined groove (14) of the plunger (12); and
wherein when making a comparison with the same load, the fuel escapes through the sub port (23b) when performing the preliminary injection (1) in amount larger than when performing the main injection (2) by setting a speed at which the preliminary injection projection (10) lifts the plunger (12) lower than that at which the main injection projection (11) lifts it.

27. A fuel injection device according to claim 24, wherein the preliminary injection projection (10) lifts the plunger (12) of the fuel injection pump (8) at a maximum lift length substantially identical to that at which the main injection projection (11) lifts it.

28. A fuel injection device for a diesel engine according to claim 27, wherein the preliminary injection projection (10) is substantially the same as the main injection projection (11) in shape.

29. A fuel injection device for a diesel engine according to claim 27, wherein the preliminary injection projection (10) is different from the main injection projection (11) in shape; and
wherein the preliminary injection projection (10) lifts the plunger (12) at a speed set lower than that at which the main injection projection (11) lifts it.

30. A fuel injection device for a diesel engine according to claim 16, wherein the preliminary injection (1) is not performed in a starting zone.

31. A fuel injection device for a diesel engine comprising:
a fuel injection pipe (20) connected to a fuel injection pump (8); and
a fuel injection nozzle (19) connected to the fuel injection pipe (20), the fuel injection nozzle (19) being attached to a cylinder head (17) so that the fuel injection device is adapted to perform a preliminary injection (1) and a main injection (2) directly into a combustion chamber (3) through the fuel injection nozzle (19);
wherein the preliminary injection (1) is adjusted to begin within a valve overlap term (40) but not to be performed in a starting zone.

32. A fuel injection device for a diesel engine according to claim 31, wherein the preliminary injection (1) is further adjusted to begin before a top dead center (41a) of an exhaust stroke (41).

33. A fuel injection device for a diesel engine according to claim 31, wherein the preliminary injection (1) is further adjusted to begin after a top dead center (41a) of an exhaust stroke (41).

34. A fuel injection device for a diesel engine according to claim 31, wherein the preliminary injection (1) is further adjusted to end within the valve overlap term (40).

35. A fuel injection device for a diesel engine according to claim 31, wherein the preliminary injection (1) is further adjusted to end after the elapse of the valve overlap term (40).

36. A fuel injection device for a diesel engine according to claim 31, wherein when making a comparison with the same load, the preliminary injection (1) becomes less than the main injection (2) in amount.

37. A fuel injection device for a diesel engine according to claim 31, wherein the preliminary injection (1) is not performed in a low load zone.

38. A fuel injection device for a diesel engine according to claim 31, wherein a preliminary injection amount gradually approaches zero as the load decreases, in middle and high load zones.

39. A fuel injection device for a diesel engine according to claim 31, further comprising:
a fuel injection cam (9) provided with a projection (10) for the preliminary injection (1) and a projection (11) for the main injection (2), the preliminary injection projection (10) being opposed to the main injection projection (11) with a rotation center (9a) of the cam (9) interposed therebetween.

40. A fuel injection device for a diesel engine according to claim 39, wherein the fuel injection pump (8) is ported and provided with a plunger (12) having a peripheral surface including an upper, in a lifting direction, end edge (13) which comprises a portion (13a) for middle and high loads and a portion (13b) for a low load, the middle and high load portion (13a) upwardly inclining from an end of the low load portion (13b) in the lifting direction of the plunger (12); and
wherein a preliminary injection effective stroke (29) of the plunger (12) is adjusted to increase as the load increases and to decrease as the load decreases.

41. A fuel injection device for a diesel engine according to claim 39, wherein the fuel injection pump (8) is ported and provided with a plunger chamber (37); and
wherein both the preliminary injection (1) and the main injection (2) end by letting go a fuel within the plunger chamber (37) into a fuel sump chamber (22) through a spill port (23).

42. A fuel injection device for a diesel engine according to claim 41, wherein a main port (23a) and a sub port (23b)

are utilized as the spill port (23), the sub port (23b) being smaller than the main port (23a), the fuel within the plunger chamber (37) being arranged to escape through the sub port (23b) into the fuel sump chamber (22) during a stroke (46) while the main port (23a) is being closed with a peripheral surface of a plunger (12) till it is opened by a inclined groove (14) of the plunger (12); and wherein when making a comparison with the same load, the fuel escapes through the sub port (23b) when performing the preliminary injection (1) in amount larger than when performing the main injection (2) by setting a speed at which the preliminary injection projection (10) lifts the plunger (12), lower than that at which the main injection projection (11) lifts it.

43. A fuel injection device according to claim 39, wherein the preliminary injection projection (10) lifts a plunger (12) of the fuel injection pump (8) at a maximum lift length substantially identical to that at which the main injection projection (11) lifts it.

44. A fuel injection device for a diesel engine according to claim 43, wherein the preliminary injection projection (10) is substantially the same as the main injection projection (11) in shape.

45. A fuel injection device for a diesel engine according to claim 43, wherein the preliminary injection projection (10) is different from the main injection projection (11) in shape; and wherein the preliminary injection projection (10) lifts the plunger (12) at a speed set lower than that at which the main injection projection (11) lifts it.

* * * * *